(12) United States Patent
Drube et al.

(10) Patent No.: US 8,470,216 B2
(45) Date of Patent: Jun. 25, 2013

(54) METHOD FOR PRODUCING A COMPOSITE MATERIAL WITH IMPROVED ADHESION BETWEEN THERMOPLASTICS AND POLYURETHANE

(75) Inventors: Wolfgang Drube, Odenthal (DE); Philipp Möller, Köln (DE); Hans-Jürgen Klankers, Leverkusen (DE); Dirk Loof, Burscheid (DE)

(73) Assignee: Bayer Material Science AG, Leverkusen (DE)

( * ) Notice: Subject to any disclaimer, the term of this patent is extended or adjusted under 35 U.S.C. 154(b) by 71 days.

(21) Appl. No.: 12/846,246

(22) Filed: Jul. 29, 2010

(65) Prior Publication Data
US 2011/0027575 A1 Feb. 3, 2011

(30) Foreign Application Priority Data
Aug. 1, 2009 (DE) .................. 10 2009 035 807

(51) Int. Cl.
- B29C 44/04 (2006.01)
- B29C 44/34 (2006.01)
- B29C 67/20 (2006.01)
- B32B 27/36 (2006.01)
- B32B 27/40 (2006.01)
- C08J 9/00 (2006.01)
- C08J 9/06 (2006.01)
- C08J 9/12 (2006.01)

(52) U.S. Cl.
USPC ............ 264/45.1; 264/46.4; 264/50; 264/51; 264/54; 427/393.5; 428/319.7

(58) Field of Classification Search
None
See application file for complete search history.

(56) References Cited

U.S. PATENT DOCUMENTS

| 4,301,053 | A | | 11/1981 | Wolfrey |
| 5,308,558 | A | * | 5/1994 | Woldenberg et al. ........ 264/45.3 |
| 2002/0160177 | A1 | * | 10/2002 | Warth et al. ................ 428/318.4 |
| 2007/0182048 | A1 | * | 8/2007 | Ogawa et al. ................ 264/45.3 |
| 2009/0011213 | A1 | | 1/2009 | Tripathi |

FOREIGN PATENT DOCUMENTS

| EP | 1055717 | 11/2000 |
| EP | 1414905 | 5/2004 |
| JP | 2003136647 | 5/2003 |

OTHER PUBLICATIONS

International Search Report of PCT/EP2010/004442 and Written Opinion dated Oct. 29, 2010.
English Translation of International Preliminary Report and Written Opinion of PCT/EP2010/004442 Feb. 16, 1012.

* cited by examiner

*Primary Examiner* — Christina Johnson
*Assistant Examiner* — Benjamin Schiffman
(74) *Attorney, Agent, or Firm* — Baker Donelson Bearman Caldwell & Berkowitz, PC

(57) ABSTRACT

The present disclosure relates to a method for producing composite materials containing as a first layer a foamed thermoplastic support and as a second layer polyurethane (PU), the resulting composite materials being characterized by improved foam adhesion, wherein
(i) a foamed polycarbonate molding composition is produced by injection molding using chemical or physical foaming techniques, and
(ii) the polyurethane reaction system is applied on top and allowed to cure.

The disclosure also provides the composite systems produced by this method and their use as a component, in particular in the automotive sector.

19 Claims, No Drawings

METHOD FOR PRODUCING A COMPOSITE MATERIAL WITH IMPROVED ADHESION BETWEEN THERMOPLASTICS AND POLYURETHANE

CROSS REFERENCE TO RELATED APPLICATION

This application claims priority to DE 102009035807 filed Aug. 1, 2009, the content of which is incorporated herein by reference in its entirety.

BACKGROUND

1. Field

The invention relates to a method for producing composite materials containing as a first layer a foamed thermoplastic support and as a second layer polyurethane (PU), the resulting composite materials being characterised by improved foam adhesion. The invention also provides the composite systems produced by this method and their use as a component, in particular in the automotive sector.

2. Description of Related Art

The use of compositions containing aromatic polycarbonate and rubber-modified graft polymer as a compact (i.e. non-foamed) support in a composite with polyurethane is known.

A composite material made from polyurethane and a compact thermoplastic is known from EP-A 1057851 in which in order to improve adhesion the polyurethane layer contains homogeneously distributed particles having an average particle size of 1 to 10 nm, which are coated with a thermoplastic.

Furthermore, a composite material made from polyurethane and a compact thermoplastic material is known from EP-A 1055717 wherein in order to improve the adhesion between the polyurethane and the thermoplastic layer a polyurethane is used which has a residual content of free ether-group-containing reaction components of at most 400 ppm.

In the prior art structured and unstructured compact thermoplastic supports are produced in a mould. Depending on the thermoplastic used (for example glass-fibre-reinforced polypropylene or impact-modified polycarbonate), the surface of the thermoplastic support is optionally modified by priming or activation, for example. This modification of the surface of the thermoplastic support is used in particular if a highly reactive polyurethane system (i.e. having a demould time of less than 100 seconds) is used for the composite.

SUMMARY

An object of the invention was to achieve an improved composite between the thermoplastic support and the polyurethane, with the proviso that no modification of the surface (in particular priming or surface activation) of the thermoplastic support is necessary, in particular if a highly reactive polyurethane system (i.e. having a demould time of less than 100 seconds) is used for the composite. The resulting composite should exhibit solid adhesion. This adhesion is assessed in particular using the test criteria of initial adhesion, adhesion after a double climatic test (based on PV1200 from Volkswagen AG) and a blooming test.

Surprisingly this object can be achieved according to the present invention by a method wherein (i) a foamed polycarbonate moulding composition is produced by injection moulding using chemical or physical foaming techniques, and (ii) a polyurethane reaction system is applied on top and allowed to cure.

The present invention thus also provides the use of foamed thermoplastics as a support for polyurethane, in particular foamed polyurethane based on aromatic isocyanates, and the resulting composite parts.

The use of foamed polycarbonate moulding compositions as a thermoplastic support has an advantage that the adhesive bond between the thermoplastic support and the polyurethane is improved and that improved adhesion between the thermoplastic support and the polyurethane (particularly after a double climatic test) results, without there being a need for a further processing step for the surface activation or priming of the support. The saving of this processing step is of great economic importance.

To produce the foamed thermoplastic, compositions and moulding compositions are provided comprising:

A) 20 to 99.9 parts by weight, preferably 50 to 91.5 parts by weight, of aromatic polycarbonate and/or aromatic polyester carbonate, B) 0.1 to 40 parts by weight, preferably 0.4 to 35 parts by weight, of rubber-modified graft polymer, C) 0 to 40 parts by weight, preferably 1 to 30 parts by weight, of vinyl (co)polymer (C.1) and/or polyalkylene terephthalate (C.2), D) 0 to 50 parts by weight, preferably 7 to 35 parts by weight, of glass fibres, and E) 0 to 30 parts by weight, preferably 0.1 to 18 parts by weight, particularly preferably 0.5 to 5 parts by weight, of additives, the sum of components A+B+C+D+E being standardised to 100 parts by weight

DETAILED DESCRIPTION OF A PREFERRED EMBODIMENT

In a preferred embodiment of the invention, the polycarbonate compositions should also have excellent mechanical properties (in particular high rigidity, high heat resistance and low coefficient of linear expansion).

Surprisingly it was found that this further technical object too is capable of being achieved with the use of compositions of the thermoplastic support containing glass fibres (component D).

The individual components of the polycarbonate composition according to the invention and of the composite with polyurethane are described below by way of example.

Component A

Aromatic polycarbonates and/or aromatic polyester carbonates according to component A which are suitable according to the invention are known from the literature or can be produced by methods known from the literature (regarding the production of aromatic polycarbonates see for example Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; regarding the production of aromatic polyester carbonates see for example DE-A 3 077 934).

Aromatic polycarbonates are produced for example by reacting diphenols with carbonic acid halides, preferably phosgene, and/or with aromatic dicarboxylic acid dihalides, preferably benzene dicarboxylic acid dihalides, by the interfacial polycondensation process, optionally using chain terminators, for example monophenols, and optionally using trifunctional or higher-functional branching agents, for example triphenols or tetraphenols. Production via a melt polymerisation process by reacting diphenols with diphenyl carbonate, for example, is also possible.

Diphenols for producing the aromatic polycarbonates and/or aromatic polyester carbonates are preferably those of formula (I)

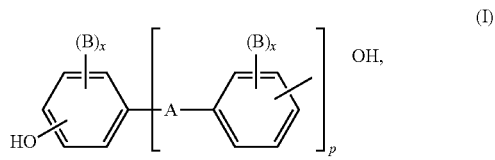

wherein

A is a single bond, $C_1$ to $C_5$ alkylene, $C_2$ to $C_5$ alkylidene, $C_5$ to $C_6$ cycloalkylidene, —O—, —SO—, —CO—, —S—, —SO$_2$—, $C_6$ to $C_{12}$ arylene, to which further aromatic optionally heteroatom-containing rings can be fused, or a radical of formula (II) or (III)

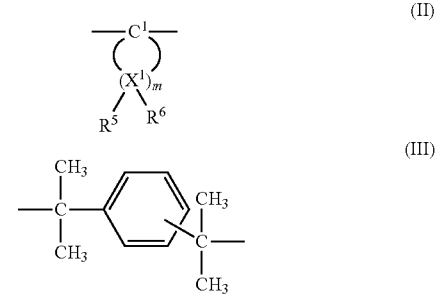

B is in each case $C_1$ to $C_{12}$ alkyl, preferably methyl, halogen, preferably chlorine and/or bromine x is in each case independently 0, 1 or 2, p is 1 or 0, and $R^5$ and $R^6$ can be selected individually for each $X^1$ and independently of one another denote hydrogen or $C_1$ to $C_6$ alkyl, preferably hydrogen, methyl or ethyl, $X^1$ denotes carbon and m denotes a whole number from 4 to 7, preferably 4 or 5, with the proviso that at on least one $X^1$ atom $R^5$ and $R^6$ are both alkyl.

Preferred diphenols are hydroquinone, resorcinol, dihydroxydiphenols, bis-(hydroxyphenyl) $C_1$-$C_5$ alkanes, bis-(hydroxyphenyl) $C_5$-$C_6$ cycloalkanes, bis-(hydroxyphenyl) ethers, bis-(hydroxyphenyl) sulfoxides, bis-(hydroxyphenyl) ketones, bis-(hydroxyphenyl) sulfones and α,α-bis-(hydroxyphenyl) diisopropyl benzenes and the ring-brominated and/or ring-chlorinated derivatives thereof.

Particularly preferred diphenols are 4,4'-dihydroxydiphenyl, bisphenol A, 2,4-bis(4-hydroxyphenyl)-2-methylbutane, 1,1-bis-(4-hydroxyphenyl)cyclohexane, 1,1-bis-(4-hydroxyphenyl)-3,3,5-trimethylcyclohexane, 4,4'-dihydroxydiphenylsulfide, 4,4'-dihydroxydiphenylsulfone and the di- and tetrabrominated or chlorinated derivatives thereof, such as for example 2,2-bis-(3-chloro-4-hydroxyphenyl)propane, 2,2-bis-(3,5-dichloro-4-hydroxyphenyl)propane or 2,2-bis-(3,5-dibromo-4-hydroxyphenyl)propane. 2,2-Bis-(4-hydroxyphenyl)propane (bisphenol A) is preferred in particular.

The diphenols can be used on their own or in any combination. The diphenols are known from the literature or can be obtained by methods known from the literature.

Suitable chain terminators for the production of the thermoplastic, aromatic polycarbonates are for example phenol, p-chlorophenol, p-tert-butylphenol or 2,4,6-tribromophenol, but also long-chain alkylphenols, such as 4-[2-(2,4,4-trimethylpentyl)]phenol, 4-(1,3-tetramethylbutyl)phenol according to DE-A 2 842 005 or monoalkylphenol or dialkylphenols having in total 8 to 20 carbon atoms in the alkyl substituents, such as 3,5-di-tert-butylphenol, p-isooctylphenol, p-tert-octylphenol, p-dodecylphenol and 2-(3,5-dimethylheptyl)phenol and 4-(3,5-dimethylheptyl)phenol. The amount of chain terminators to be used is generally between 0.5 mol % and 10 mol %, relative to the molar sum of the individual diphenols used.

The thermoplastic, aromatic polycarbonates have average weight-average molecular weights ($M_w$, measured for example by GPC, ultracentrifuge or light-scattering measurement) of 10,000 to 200,000 g/mol, preferably 15,000 to 80,000 g/mol, particularly preferably 24,000 to 32,000 g/mol.

The thermoplastic, aromatic polycarbonates can be branched in a known manner, and preferably by the incorporation of 0.05 to 2.0 mol %, relative to the sum of diphenols used, of trifunctional or higher-functional compounds, for example those having three or more phenolic groups.

Both homopolycarbonates and copolycarbonates are suitable. For the production of copolycarbonates according to component A of the invention, 1 to 25 wt. %, preferably 2.5 to 25 wt. %, relative to the total amount of diphenols to be used, of polydiorganosiloxanes having hydroxyaryloxy end groups can also be used. These are known (U.S. Pat. No. 3,419,634) and can be produced by methods known from the literature. The production of copolycarbonates containing polydiorganosiloxanes is described in DE-A 3 334 782.

Preferred polycarbonates in addition to the bisphenol A homopolycarbonates are the copolycarbonates of bisphenol A having up to 15 mol %, relative to the molar sums of diphenols, of other diphenols cited as being preferred or particularly preferred, in particular 2,2-bis(3,5-dibromo-4-hydroxyphenyl)propane.

Aromatic dicarboxylic acid dihalides for the production of aromatic polyester carbonates are preferably the diacid dichlorides of isophthalic acid, terephthalic acid, diphenyl ether-4,4'-dicarboxylic acid and naphthalene-2,6-dicarboxylic acid. Mixtures of the diacid dichlorides of isophthalic acid and terephthalic acid in the ratio between 1:20 and 20:1 are particularly preferred.

A carbonic acid halide, preferably phosgene, is additionally incorporated in the production of polyester carbonates as a bifunctional acid derivative.

In addition to the monophenols already mentioned, the chloroformic acid esters thereof and the acid chlorides of aromatic monocarboxylic acids, which can optionally be substituted by $C_1$ to $C_{22}$ alkyl groups or by halogen atoms, and aliphatic $C_2$ to $C_{22}$ monocarboxylic acid chlorides are also suitable as chain terminators for the production of the aromatic polyester carbonates.

The amount of chain terminators in each case is 0.1 to 10 mol %, relative in the case of phenolic chain terminators to mols of diphenol and in the case of monocarboxylic acid chloride chain terminators to mols of dicarboxylic acid dichloride.

The aromatic polyester carbonates can also contain incorporated aromatic hydroxycarboxylic acids.

The aromatic polyester carbonates can be both linear and branched in a known manner (see DE-A 2 940 024 and DE-A 3 007 934 in this respect).

Trifunctional or higher-functional carboxylic acid chlorides, such as trimesic acid trichloride, cyanuric acid trichloride, 3,3'-4,4'-benzophenone tetracarboxylic acid tetrachloride, 1,4,5,8-naphthalene tetracarboxylic acid tetrachloride or pyromellitic acid tetrachloride, in amounts from 0.01 to 1.0 mol % (relative to dicarboxylic acid dichlorides used) or trifunctional or higher-functional phenols, such as phloroglucinol, 4,6-dimethyl-2,4,6-tri-(4-hydroxyphenyl) hept-2-ene, 4,6-dimethyl-2,4-6-tri-(4-hydroxyphenyl) heptane, 1,3,5-tri-(4-hydroxyphenyl)benzene, 1,1,1-tri-(4-hydroxyphenyl) ethane, tri-(4-hydroxyphenyl)phenylmethane, 2,2-bis[4,4-bis-(4-hydroxy-phenyl)cyclohexyl]propane, 2,4-bis-(4-hydroxyphenyl isopropyl)phenol, tetra-(4-hydroxyphenyl) methane, 2,6-bis-(2-hydroxy-5'-methylbenzyl)-4-methyl phenol, 2-(4-hydroxyphenyl)-2-(2,4-dihydroxyphenyl) propane, tetra-(4-[4-hydroxyphenyl isopropyl]phenoxy)methane, 1,4-bis-[4',4''-dihydroxytriphenyl)methyl]benzene, in amounts from 0.01 to 1.0 mol %, relative to diphenols used, can be used for example as branching agents. Phenolic branching agents can be added with the diphenols, acid chloride branching agents can be introduced together with the acid dichlorides.

The proportion of carbonate structural units in the thermoplastic, aromatic polyester carbonates can vary as required. The proportion of carbonate groups is preferably up to 100 mol %, in particular up to 80 mol %, particularly preferably up to 50 mol %, relative to the sum of ester groups and carbonate groups. Both the ester and the carbonate component of the aromatic polyester carbonates can be present in the form of blocks or be randomly distributed in the polycondensate.

The relative solution viscosity ($\eta_{rel}$) of the aromatic polycarbonates and polyester carbonates is in the range from 1.18 to 1.4, preferably 1.20 to 1.32 (measured in solutions of 0.5 g polycarbonate or polyester carbonate in 100 ml methylene chloride solution at 25° C.).

The thermoplastic, aromatic polycarbonates and polyester carbonates can be used on their own or in any combination.

Component B

Component B comprises one or more graft polymers of
B.1 10 to 90 wt. %, preferably 20 to 60 wt. %, in particular 25 to 50 wt. %, relative to component B, of at least one vinyl monomer on
B.2 90 to 10 wt. %, preferably 80 to 40 wt. %, in particular 75 to 50 wt. %, relative to component B, of at least one graft base selected from the group consisting of diene rubbers, EP(D)M rubbers (i.e. those based on ethylene/propylene and optionally diene), acrylate, polyurethane, silicone, silicone acrylate, chloroprene and ethylene/vinyl acetate rubbers.

The graft base B.2 generally has an average particle size ($d_{50}$ value) of 0.05 to 10 µm, preferably 0.1 to 5 µm, particularly preferably 0.2 to 1 µm.

Monomers B.1 are preferably mixtures of
B.1.1 50 to 99 parts by weight of vinyl aromatics and/or ring-substituted vinyl aromatics (such as styrene, α-methylstyrene, p-methylstyrene, p-chlorostyrene) and/or (meth)acrylic acid ($C_1$-$C_8$) alkyl esters, such as methyl methacrylate, ethyl methacrylate, and
B.1.2 1 to 50 parts by weight of vinyl cyanides (unsaturated nitriles such as acrylonitrile and methacrylonitrile) and/or (meth)acrylic acid ($C_1$-$C_8$) alkyl esters, such as methyl methacrylate, n-butyl acrylate, t-butyl acrylate, and/or derivatives (such as anhydrides and imides) of unsaturated carboxylic acids, for example maleic anhydride and N-phenyl maleinimide.

Preferred monomers B.1.1 are selected from at least one of the monomers styrene, α-methylstyrene and methyl methacrylate, preferred monomers B.1.2 are selected from at least one of the monomers acrylonitrile, maleic anhydride and methyl methacrylate.

Particularly preferred monomers are B.1.1 styrene and B.1.2 acrylonitrile.

Preferred graft bases B.2 are silicone rubbers, silicone acrylate rubbers, diene rubbers (based for example on butadiene and isoprene) or mixtures of diene rubbers. Within the meaning of the invention diene rubbers are understood to include copolymers of diene rubbers or mixtures thereof with other copolymerisable monomers (e.g. according to B.1.1 and B.1.2). The graft bases B.2 generally have a glass transition temperature of <10° C., preferably less than <0° C., particularly preferably <−10° C.

Particularly preferred polymers B are for example ABS polymers and MBS polymers, preferably those produced by emulsion polymerisation, such as are described for example in DE-OS 2 035 390 (=U.S. Pat. No. 3,644,574) or in DE-OS 2 248 242 (=GB-PS 1 409 275) or in Ullmanns Enzyklopädie der Technischen Chemie, vol. 19 (1980), p. 280 ff. The gel content of graft base B.2 is at least 20 wt. % in the case of graft bases B.2 produced by emulsion polymerisation, preferably at least 40 wt. % (measured in toluene).

The graft polymer consisting of components B.1 and B.2 preferably has a core-shell structure, with component B.1 forming the shell and component B.2 forming the core.

The graft copolymers B are produced by radical polymerisation, for example by emulsion, suspension, solution or bulk polymerisation, preferably by emulsion polymerisation.

Particularly suitable graft rubbers are also graft copolymers B produced by emulsion polymerisation by means of redox initiation with an initiator system consisting of organic hydroperoxide and ascorbic acid as described in U.S. Pat. No. 4,937,285.

Since it is known that the graft monomers are not necessarily completely grafted onto the graft base during the graft reaction, according to the invention graft polymers B are also understood to include such products which are obtained by (co)polymerisation of the graft monomers in the presence of the graft base and which co-accumulate during preparation.

Suitable acrylate rubbers according to B.2 of polymers B are preferably polymers of acrylic acid alkyl esters, optionally with up to 40 wt. %, relative to B.2, of other polymerisable, ethylenically unsaturated monomers. The preferred polymerisable acrylic acid esters include C1-C8 alkyl esters, for example methyl, ethyl, butyl, n-octyl and 2-ethylhexyl ester; haloalkyl esters, preferably halo C1-C8 alkyl esters, such as chloroethyl acrylate, and mixtures of these monomers.

Monomers having more than one polymerisable double bond can be copolymerised for crosslinking. Preferred examples of crosslinking monomers are esters of unsaturated monocarboxylic acids having 3 to 8 C atoms and unsaturated monohydric alcohols having 3 to 12 C atoms, or saturated polyols having 2 to 4 OH groups and 2 to 20 C atoms, such as ethylene glycol dimethacrylate, allyl methacrylate; polyunsaturated heterocyclic compounds, such as trivinyl and triallyl cyanurate; polyfunctional vinyl compounds, such as divinyl and trivinyl benzenes; but also triallyl phosphate and diallyl phthalate. Preferred crosslinking monomers are allyl methacrylate, ethylene glycol dimethacrylate, diallyl phthalate and heterocyclic compounds having at least three ethylenically unsaturated groups. Particularly preferred crosslinking monomers are the cyclic monomers triallyl cyanurate, triallyl isocyanurate, triacryloyl hexahydro-s-triazine, triallyl benzenes. The amount of crosslinking monomers is preferably 0.02 to 5, in particular 0.05 to 2 wt. %, relative to the graft base B.2. In the case of cyclic crosslinking monomers having at least three ethylenically unsaturated groups it is advantageous to restrict the amount to less than 1 wt. % of the graft base B.2.

Preferred "other" polymerisable, ethylenically unsaturated monomers which can optionally serve to produce the graft base B.2 in addition to the acrylic acid esters are for example acrylonitrile, styrene, α-methylstyrene, acrylamides, vinyl C1-C6 alkyl ethers, methyl methacrylate, butadiene. Preferred acrylate rubbers as the graft base B.2 are emulsion polymers having a gel content of at least 60 wt. %.

Suitable silicone rubbers according to B.2 can be produced by emulsion polymerisation, as described for example in U.S. Pat. No. 2,891,920 and U.S. Pat. No. 3,294,725. Other suitable graft bases according to B.2 are silicone rubbers having graft-active sites, such as are described in DE-OS 3 704 657, DE-OS 3 704 655, DE-OS 3 631 540 and DE-OS 3 631 539.

Silicone acrylate rubbers are also suitable according to the invention as graft bases B.2. These silicone acrylate rubbers are composite rubbers with graft-active sites having a silicone rubber content of 10 to 90 wt. % and a polyalkyl (meth) acrylate rubber content of 90 to 10 wt. %, wherein the two cited rubber components can interpenetrate in the composite rubber such that they cannot substantially be separated from each other, or they can have a core-shell structure. Silicone acrylate rubbers are known and are described for example in U.S. Pat. No. 5,807,914, EP 430134 and U.S. Pat. No. 4,888, 388. Such graft polymers based on silicone acrylate rubbers, produced by emulsion polymerisation, are preferably used with B.1 methyl methacrylate or B.1.1 styrene and B.1.2 acrylonitrile.

The gel content of graft base B.2 is determined at 25° C. in a suitable solvent (M. Hoffmann, H. Krömer, R. Kuhn, Polymeranalytik I and II, Georg Thieme-Verlag, Stuttgart 1977).

The average particle size d50 is the diameter above and below which respectively 50 wt. % of the particles lie. It can be determined by ultracentrifuge measurement (W. Scholtan, H. Lange, Kolloid, Z. and Z. Polymere 250 (1972), 782-1796).

Component C

Component C comprises one or more thermoplastic vinyl (co)polymers C.1 and/or polyalkylene terephthalate C.2.

Polymers of at least one monomer from the group of vinyl aromatics, vinyl cyanides (unsaturated nitriles), (meth) acrylic acid ($C_1$-$C_8$) alkyl esters, unsaturated carboxylic acids and derivatives (such as anhydrides and imides) of unsaturated carboxylic acids are suitable as vinyl (co)polymers C.1. Particularly suitable are (co)polymers consisting of C.1.1 50 to 99, preferably 60 to 80 parts by weight of vinyl aromatics and/or ring-substituted vinyl aromatics such as styrene, α-methylstyrene, p-methylstyrene, p-chlorostyrene and/or (meth)acrylic acid ($C_1$-$C_8$) alkyl esters, such as methyl methacrylate, ethyl methacrylate, and C.1.2 1 to 50, preferably 20 to 40 parts by weight of vinyl cyanides (unsaturated nitriles) such as acrylonitrile and methacrylonitrile and/or (meth)acrylic acid ($C_1$-$C_8$) alkyl esters, such as methyl methacrylate, n-butyl acrylate, t-butyl acrylate, and/or unsaturated carboxylic acids, such as maleic acid, and/or derivatives, such as anhydrides and imides, of unsaturated carboxylic acids, for example maleic anhydride and N-phenyl maleinimide.

The vinyl (co)polymers C.1 are resin-like, thermoplastic and rubber-free. The copolymer consisting of C.1.1 styrene and C.1.2 acrylonitrile is particularly preferred.

The (co)polymers according to C.1 are known and can be produced by radical polymerisation, in particular by emulsion, suspension, solution or bulk polymerisation. The (co) polymers preferably have average molecular weights Mw (weight-average, determined by light scattering or sedimentation) of between 15,000 and 200,000.

The polyalkylene terephthalates of component C.2 are reaction products of aromatic dicarboxylic acids or reactive derivatives thereof, for example dimethyl esters or anhydrides, and aliphatic, cycloaliphatic or araliphatic diols and mixtures of these reaction products.

Preferred polyalkylene terephthalates contain at least 80 wt. %, preferably at least 90 wt. %, relative to the dicarboxylic acid component, of terephthalic acid radicals and at least 80 wt. %, preferably at least 90 mol %, relative to the diol component, of ethylene glycol and/or butanediol-1,4 radicals.

The preferred polyalkylene terephthalates can contain in addition to terephthalic acid esters up to 20 mol %, preferably up to 10 mol %, of radicals of other aromatic or cycloaliphatic dicarboxylic acids having 8 to 14 C atoms or aliphatic dicarboxylic acids having 4 to 12 C atoms, such as for example radicals of phthalic acid, isophthalic acid, naphthalene-2,6-dicarboxylic acid, 4,4'-diphenyl dicarboxylic acid, succinic acid, adipic acid, sebacic acid, azelaic acid, cyclohexane diacetic acid.

The preferred polyalkylene terephthalates can contain, in addition to ethylene glycol or butanediol-1,4 radicals, up to 20 mol %, preferably up to 10 mol %, of other aliphatic diols having 3 to 12 C atoms or cycloaliphatic diols having 6 to 21 C atoms, for example radicals of propanediol-1,3,2-ethyl propanediol-1,3, neopentyl glycol, pentanediol-1,5, hexanediol-1,6, cyclohexane dimethanol-1,4,3-ethyl pentanediol-2,4,2-methyl pentanediol-2,4,2,2,4-trimethyl pentanediol-1,3,2-ethyl hexanediol-1,3,2,2-diethyl propanediol-1,3, hexanediol-2,5,1,4-di-(β-hydroxyethoxy)benzene, 2,2-bis-(4-hydroxycyclohexyl)propane, 2,4-dihydroxy-1,1,3,3-tetramethylcyclobutane, 2,2-bis-(4-β-hydroxyethoxyphenyl) propane and 2,2-bis-(4-hydroxypropoxyphenyl)propane (DE-A 2 407 674, 2 407 776, 2 715 932).

The polyalkylene terephthalates can be branched by the incorporation of relatively small amounts of trihydric or tetrahydric alcohols or tribasic or tetrabasic carboxylic acids, as described for example in DE-A 1 900 270 and U.S. Pat. No. 3,692,744. Examples of preferred branching agents are trimesic acid, trimellitic acid, trimethylol ethane and propane and pentaerythritol.

Polyalkylene terephthalates produced solely from terephthalic acid and reactive derivatives thereof (for example dialkyl esters thereof) and ethylene glycol and/or butanediol-1,4, and mixtures of these polyalkylene terephthalates, are particularly preferred.

Mixtures of polyalkylene terephthalates contain 1 to 50 wt. %, preferably 1 to 30 wt. %, of polyethylene terephthalate and 50 to 99 wt. %, preferably 70 to 99 wt. %, of polybutylene terephthalate.

The polyalkylene terephthalates that are preferably used generally have an intrinsic viscosity of 0.4 to 1.5 dl/g, preferably 0.5 to 1.2 dl/g, measured in phenol/o-dichlorobenzene (1:1 parts by weight) at 25° C. in an Ubbelohde viscometer.

The polyalkylene terephthalates can be produced by known methods (see for example Kunststoff-Handbuch, volume VIII, p. 695 ff., Carl-Hanser-Verlag, Munich 1973).

Component D

In a preferred embodiment of the invention, chopped or ground glass fibres are used as component D.

Component D is preferably a sized glass fibre having

D.1 a glass fibre selected from at least one component of the group consisting of continuous strands (rovings), long glass fibres and chopped strands, D.2 a size containing an epoxy polymer, wherein for example the size partially or wholly covers the surface of the glass fibres and/or fills any pores in the glass fibres, and D.3 optionally a coupling agent.

The size D.2 and the coupling agent D.3 can preferably be used in component D in an amount such that the content of carbon measured in component D is 0.1 to 1 wt. %, preferably 0.2 to 0.8 wt. %, particularly preferably 0.3 to 0.7 wt. %.

The glass fibres according to component D.1 are preferably produced from E-, A- or C-glass. The diameter of the glass fibres is preferably 5 to 25 μm, particularly preferably 6 to 20 μm, most preferably 7 to 15 μm. The long glass fibres preferably have a length of 5 to 50 mm, particularly preferably 5 to 30 mm, most preferably 7 to 25 mm. Long glass fibres are described for example in WO-A 2006/040087. At least 70 wt. % of the chopped strands are preferably more than 60 μm in length.

The size D.2 preferably consists of

D.2.1 50 to 100 wt. %, preferably 70 to 100 wt. %, particularly preferably 80 to 100 wt. % (relative in each case to D.2) of epoxy polymer and D.2.2 0 to 50 wt. %, preferably 0 to 30 wt. %, particularly preferably 0 to 20 wt. % (relative in each case to D.2) of one or more further polymers.

The size D.2 most preferably consists exclusively of epoxy polymer D.2.1 (i.e. the size D.2 is free from further polymers according to component D.2.2).

The epoxy polymer according to component D.2.1 can for example be an epoxy resin, an epoxy resin ester or an epoxy resin polyurethane.

In a preferred embodiment the epoxy polymer according to component D.2.1 is an epoxy resin produced from D.2.1.1 epichlorohydrin, and D.2.1.2 a preferably aromatic alcohol having at least two hydroxyl groups.

Component D.2.1.2 is preferably a phenolic resin, for example a novolak, or a compound of formula (I). Component D.2.1.2 is particularly preferably bisphenol A.

Component D.2.2 is preferably at least one polymer selected from the group consisting of polyurethanes, polyolefins, acrylate-containing polymers, styrene-containing polymers and polyamides.

Component D.3 is preferably a silane. In a preferred embodiment the silane has a functional group selected from the group comprising amino group, epoxy group, carboxylic acid group, vinyl group and mercapto group to bind to the polymer of the size and one to three, preferably three alkoxy groups to bind to the glass fibres. Preferably and by way of example, at least one silane selected from the group consisting of vinyl trichlorosilane, vinyl triethoxysilane, vinyl trimethoxysilane, γ-methacryloxypropyl trimethoxysilane, β-(3,4-epoxycyclohexyl)ethyl trimethoxysilanes, γ-glycidoxypropyl trimethoxysilane, N-β-(aminoethyl)-γ-aminopropyl trimethoxysilane, γ-aminopropyl triethoxysilane, N-phenyl-γ-aminopropyl trimethoxysilane, γ-mercaptopropyl trimethoxysilane and γ-chloropropyl trimethoxysilane is used as component D.3. Sized glass fibres containing component D.3 exhibit better adhesion of the size to the glass fibres.

Component E

The composition can contain further additives as component E, wherein in particular polymer additives such as flame retardants (for example organic phosphorus or halogen compounds, in particular bisphenol A-based oligophosphate), flame retardant synergists, antidripping agents (for example compounds of the substance classes of fluorinated polyolefins, silicones and aramid fibres), lubricants and release agents (for example pentaerythritol tetrastearate), nucleating agents, antistatics (for example conductive carbon blacks, carbon fibres, carbon nanotubes and organic antistatics such as polyalkylene ethers, alkyl sulfonates or polyamide-containing polymers), stabilisers, fillers and reinforcing materials differing from component D, and dyes and pigments (for example titanium dioxide or iron oxide) are suitable.

Glass beads, glass spheres, ceramic spheres, platelet-like reinforcing materials (such as kaolin, talc, mica), silicates, quartz, talc, titanium dioxide, wollastonite, mica, carbon fibres or mixtures thereof are suitable as fillers and reinforcing materials differing from component D. Preferred fillers and reinforcing materials are glass spheres, mica, silicates, quartz, talc, titanium dioxide and/or wollastonite.

Production of the Foamed Polycarbonate Moulding Composition (Layer (1)):

The foamed polycarbonate moulding compositions according to the invention are produced by injection moulding, (i-1) by mixing the various constituents of the polycarbonate composition (components A to E) in a known manner Mixing of the individual constituents can take place in a known manner either successively or simultaneously and both at around 20° C. (room temperature) and at elevated temperature.

(i-2) Then the mixture resulting from step (i-1) is melt compounded and melt extruded at temperatures of 200° C. to 320° C., preferably 250° C. to 290° C., in conventional units such as internal mixers, extruders and twin-shaft screws, characterised in that in step (i-2)

(i-2.1) a batch (containing chemical blowing agent and at least one of components A, B or C) is fed to the extruder with the mixture resulting from step (i-1), or (i-2.2) a chemical blowing agent is mixed with the mixture resulting from step (i-1) (for example by drum mixing, i.e. the chemical blowing agent is mixed in a drum with the mixture resulting from step (i-1) in granular form), or (i-2.3) a physical blowing agent is added to the melt. This addition is preferably made to the screw of the extruder or the twin-shaft screw, or to the space in front of the screw of the extruder or the twin-shaft screw, or to the resulting mixture immediately after the internal mixer, extruder or twin-shaft screw.

In step (i-2) the mixture resulting from step (i-1) is preferably melt compounded and melt extruded in an extruder at temperatures of 200° C. to 320° C., preferably 250° C. to 290° C., characterised in that in step (i-2)

a physical blowing agent is added to the melt in the screw of the extruder, for example using the MuCell process developed by Trexel Ltd.

Citric acid and/or formic acid for example are generally used as the chemical blowing agent. An inert gas (such as nitrogen, argon or carbon dioxide for example) is generally used as the physical blowing agent.

By virtue of their improved adhesion properties, the foamed polycarbonate moulding compositions according to the invention are particularly suitable as supports for the production of composite materials with polyurethanes. Such composite mouldings are used for example as interior components for motor vehicles, rail vehicles, aircraft and watercraft, in particular in the instrument panel area.

The invention therefore also includes composite materials containing at least a first layer (1) and a second layer (2) and wherein layer (1) contains at least one foamed polycarbonate moulding composition according to the invention and layer (2) contains at least one polyurethane, and wherein layer (1) is joined directly to layer (2).

A polyurethane foam or a compact polyurethane layer is preferably used as layer (2).

The polyurethanes or polyurethane ureas used according to the invention are obtained by reacting polyisocyanates with H-active polyfunctional compounds, preferably polyols.

Suitable polyisocyanates are preferably those known from and conventionally used in polyurethane chemistry. In particular they are polyisocyanates on an aromatic basis, for example 2,4-diisocyanatotoluene, technical mixtures thereof with 2,6-diisocyanatotoluene, 4,4'-diisocyanatodiphenyl methane, mixtures thereof with the corresponding 2,4' and 2,2' isomers, polyisocyanate mixtures of the diphenylmethane series, such as can be obtained in a manner known per se by phosgenation of aniline/formaldehyde condensates, the modification products of these technical polyisocyanates containing biuret or isocyanate groups and in particular NCO prepolymers of the cited type based on these technical polyisocyanates on the one hand and simple polyols and/or polyether polyols and/or polyester polyols on the other hand, and any mixtures of such isocyanates, provided that they are sufficiently stable in storage.

Of the higher-molecular-weight modified polyisocyanates, the prepolymers known from polyurethane chemistry having terminal isocyanate groups from the molecular weight range 400 to 10,000, preferably 600 to 8000, are of interest in particular. These compounds are produced in a manner known per se by reacting excess amounts of simple polyisocyanates of the type cited by way of example with organic compounds having at least two isocyanate-group-reactive groups, in particular organic polyhydroxyl compounds. Suitable polyhydroxyl compounds of this type are both simple polyhydric alcohols from the molecular weight range 82 to 599, preferably 62 to 200, such as for example ethylene glycol, trimethylol propane, propanediol-1,2 or butanediol-1,4 or butanediol-2,3, in particular however higher-molecular-weight polyether polyols and/or polyester polyols of the type known per se from polyurethane chemistry having molecular weights of 600 to 8000, preferably 800 to 4000, which have at least two, generally 2 to 8, but preferably 2 to 4 primary and/or secondary hydroxyl groups. Such NCO prepolymers obtained for example from low-molecular-weight polyisocyanates of the type cited by way of example and less preferred compounds having isocyanate-group-reactive groups, such as for example polythioether polyols, hydroxyl-group-containing polyacetals, polyhydroxy polycarbonates, hydroxyl-group-containing polyesteramides or hydroxyl-group-containing copolymers of olefinically unsaturated compounds, can also be used of course.

Suitable compounds having isocyanate-group-reactive groups, in particular hydroxyl groups, for producing the NCO prepolymers are for example the compounds disclosed in U.S. Pat. No. 4,218,543. In the production of the NCO prepolymers these compounds having isocyanate-group-reactive groups are reacted with simple polyisocyanates of the type cited above by way of example, whilst maintaining an NCO excess. The NCO prepolymers generally have an NCO content of 10 to 25, preferably 15 to 22 wt. %. It already follows from this that in the context of the present invention, "NCO prepolymers" and "prepolymers having terminal isocyanate groups" are understood to mean both the reaction products as such and the mixtures with excess amounts of unreacted starting polyisocyanates, which are often also known as "semi-prepolymers".

The polyisocyanate component has an average functionality of 2 to 3, preferably of 2.3 to 2.7.

To establish a particular NCO content in the isocyanate component it can be useful to mix proportions of crude MDI with an NCO prepolymer. The proportions of higher-functional material (functionality >4) contained in the crude MDI can be tolerated without difficulty provided that the average functionality of 3 is not exceeded in the isocyanate component.

The chain extenders conventionally crosslinked in polyurethane chemistry, such as ethylene glycol, diethylene glycol, propylene glycol, dipropylene glycol, butanediol-1,4, propanediol-1,3, are suitable as aliphatic diols having an OH value of >500 mg KOH/g. Diols such as 2-butanediol-1,4, butenediol-1,3, butanediol-2,3,2-butanediol-1,4 and/or 2-methyl propanediol-1,3 are preferred. Naturally it is also possible to use a mixture of the aliphatic diols.

Polyols having an average OH value of 5 to 500 mg KOH/g and an average functionality of 2 to 6, preferably 2 to 4, particularly preferably 2.7 to 3, are suitable as the H-active component. Polyols having an average OH value of 10 to 50 mg KOH/g are preferred. Suitable polyols according to the invention are for example polyhydroxy polyethers, which are accessible via the alkoxylation of suitable starter molecules such as ethylene glycol, diethylene glycol, 1,4-dihydroxybutane, 1,6-dihydroxyhexane, dimethylol propane, glycerol, pentaerythritol, sorbitol or sucrose Ammonia or amines such as ethylene diamine, hexamethylene diamine, 2,4-diaminotoluene, aniline or amino alcohols or phenols such as bisphenol A can also act as starters. The alkoxylation takes place using propylene oxide and/or ethylene oxide in any order or as a mixture.

Also suitable are polyester polyols such as can be accessed by reacting low-molecular-weight alcohols with polyvalent carboxylic acids such as adipic acid, phthalic acid, hexahydrophthalic acid, tetrahydrophthalic acid or the anhydrides of these acids in a manner known per se, provided that the viscosity of the H-active component does not become too great. A preferred polyol containing ester groups is castor oil. Also suitable in addition are preparations with castor oil, such as can be obtained by dissolving resins, for example aldehyde-ketone resins, and modifications of castor oil and polyols based on other natural oils.

Also suitable are such higher-molecular-weight polyhydroxy polyethers containing high-molecular-weight polyadducts or polycondensates or polymers in finely dispersed, dissolved or grafted form. Such modified polyhydroxy compounds are obtained in a manner known per se, for example, if polyaddition reactions (e.g. reactions between polyisocyanates and amino-functional compounds) or polycondensation reactions (e.g. between formaldehyde and phenols and/or amines) are allowed to proceed in situ in the hydroxyl-group-containing compounds. However, it is also possible to mix a ready-made aqueous polymer dispersion with a polyhydroxyl compound and then to remove the water from the mixture.

Vinyl-polymer-modified polyhydroxyl compounds, such as are obtained for example by polymerisation of styrene and acrylonitrile in the presence of polyethers or polycarbonate polyols, are also suitable for the production of polyurethanes. If polyether polyols modified in accordance with DE-A 2 442 101, DE-A 2 844 922 and DE-A 2 646 141 by graft polymerisation with vinyl phosphonic acid esters and optionally (meth)acrylonitrile, (meth)acrylamide or OH-functional (meth)acrylic acid esters are used, plastics having exceptional flame resistance are obtained.

Representatives of the cited compounds for use as H-active compounds are described for example in High Polymers, Vol.

XVI, "Polyurethanes Chemistry and Technology", Saunders-Frisch (ed.) Interscience Publishers, New York, London, Vol. 1, p. 32-42, 44, 54 and Vol. II, 1984, p. 5-6 and p. 198-199.

Mixtures of the listed compounds can also be used.

The limiting of the average OH value and average functionality of the H-active component arises in particular from the increasing embrittlement of the resulting polyurethane. In principle, however, the possibilities for influencing the polymer-physical properties of the polyurethane are known to the person skilled in the art, such that the NCO component, aliphatic diol and polyol can be adapted to one another in a favourable manner The polyurethane layer (2) can be foamed or solid, for example in the form of a paint or coating.

All auxiliary substances and additives known per se, such as for example release agents, blowing agents, fillers, catalysts and flame retardants, can be used in their production.

The following can optionally be used as auxiliary agents and additives:

a) Water and/or highly volatile inorganic or organic substances as blowing agents Suitable organic blowing agents are for example acetone, ethyl acetate, halogen-substituted alkanes such as methylene chloride, chloroform, ethylidene chloride, vinylidene chloride, monofluorotrichloromethane, chlorodifluoromethane, dichlorodifluoromethane, also butane, hexane, heptane or diethyl ether, suitable inorganic blowing agents are air, $CO_2$ or $N_2O$. A blowing effect can also be achieved by the addition of compounds which undergo decomposition at temperatures above room temperature with release of gases, for example nitrogen, for example azo compounds such as azo dicarbonamide or azoisobutyric acid nitrile.

b) Catalysts

Examples of catalysts are tertiary amines (such as triethylamine, tributylamine, N-methyl morpholine, N-ethyl morpholine, N,N,N',N'-tetramethyl ethylene diamine, pentamethyl diethylene triamine and higher homologues, 1,4-diazabicyclo-(2,2,2)octane, N-methyl-N'-dimethylaminoethyl piperazine, bis-(dimethylaminoalkyl)piperazines, N,N-dimethylbenzylamine, N,N-dimethyl cyclohexylamine, N,N-diethylbenzylamine, bis-(N,N-diethylaminoethyl)adipate, N,N,N',N'-tetramethyl-1, 3-butanediamine, N,N-dimethyl-β-phenylethylamine, 1,2-dimethylimidazole, 2-methylimidazole), monocyclic and bicyclic amides, bis-(dialkylamino)alkyl ether, tertiary amines containing amide groups (preferably formamide groups), Mannich bases consisting of secondary amines (such as dimethylamine) and aldehydes (preferably formaldehyde or ketones such as acetone, methyl ethyl ketone or cyclohexanone) and phenols (such as phenol, nonyl phenol or bisphenol), tertiary amines having isocyanate-group-active hydrogen atoms (e.g. triethanolamine, triisopropanolamine, N-methyl diethanolamine, N-ethyl diethanolamine, N,N-dimethyl ethanolamine) and the reaction products thereof with alkylene oxides such as propylene oxide and/or ethylene oxide, secondary tertiary amines, silaamines having carbon-silicon bonds (2,2,4-trimethyl-2-silamorpholine and 1,3-diethylaminomethyl tetramethyldisiloxane), nitrogen-containing bases (such as tetraalkyl ammonium hydroxides), alkali hydroxides (such as sodium hydroxide, alkali phenolates such as sodium phenolate), alkali alcoholates (such as sodium methylate), and/or hexahydrotriazines.

The reaction between NCO groups and Zerewitinoff-active hydrogen atoms is also sharply accelerated in a manner known per se by lactams and azalactams, with a supramolecular assembly being formed first of all between the lactam and the compound containing acidic hydrogen.

Organic metal compounds, in particular organic tin compounds, can also be used as catalysts. In addition to sulfur-containing compounds such as di-n-octyl tin mercaptide, suitable organic tin compounds are preferably tin(II) salts of carboxylic acids, such as tin(II) acetate, tin(II) octoate, tin(II) ethyl hexoate and tin(II) laurate, and the tin(IV) compounds, for example dibutyl tin oxide, dibutyl tin dichloride, dibutyl tin diacetate, dibutyl tin dilaurate, dibutyl tin maleate or dioctyl tin diacetate.

Naturally all the aforementioned catalysts can be used as blends. Combinations of organic metal compounds and amidines, aminopyridines or hydrazinopyridines are of particular interest in this respect.

The catalysts are generally used in an amount of between around 0.001 and 10 wt. %, relative to the total amount of compounds having at least two isocyanate-reactive hydrogen atoms.

c) Surface-active additives such as emulsifiers and foam stabilisers

Suitable emulsifiers are for example the sodium salts of castor oil sulfonates or salts of fatty acids with amines such as oleic acid diethylamine or stearic acid diethanolamine. Alkali or ammonium salts of sulfonic acids such as dodecyl benzene sulfonic acid or dinaphthyl methane disulfonic acid, or of fatty acids such as ricinoleic acid or of polymeric fatty acids can also be incorporated as surface-active additives.

Polyether siloxanes, especially water-soluble representatives, are suitable above all as foam stabilisers. These compounds are generally structured in such a way that a copolymer consisting of ethylene oxide and propylene oxide is bonded to a polydimethyl siloxane radical. Polysiloxane-polyoxyalkylene copolymers branched via allophanate groups are in many cases of particular interest.

d) Reaction retarders

Suitable reaction retarders are for example acid-reacting substances (such as hydrochloric acid or organic acid halides), also cell regulators of the type known per se (such as paraffins or fatty alcohols) or dimethyl polysiloxanes, and pigments or dyes and flame retardants of the type known per se (for example tris-chloroethyl phosphate, tricresyl phosphate or ammonium phosphate and polyphosphate), also stabilisers against ageing and weathering influences, plasticisers and fungistatic and bacteriostatic substances and fillers (such as barium sulfate, kieselguhr, carbon black or prepared calcium carbonate).

Other examples of surface-active additives and foam stabilisers and cell regulators, reaction retarders, stabilisers, flame-retardant substances, plasticisers, dyes and fillers and fungistatic and bacteriostatic substances which can optionally be incorporated according to the invention are known to the person skilled in the art and described in the literature.

According to a further preferred embodiment of the invention the composite material according to the invention includes at least one further polymeric layer (3), in particular a layer based on polyvinyl chloride (PVC), based on polyurethane (preferably a polyurethane spray skin) or on a thermoplastic urethane (TPU). Layer (3) is preferably joined directly to layer (2).

Production of the Composite Material:

The composites can be produced in a known manner Layer (1) is preferably produced in advance from the polycarbonate composition according to the invention and the polyurethane reaction system is applied on top and cured. Depending on the reactivity of the polyurethane reaction components, they can already be premixed or can be mixed in a known manner during application.

Composites containing layers (1), (2) and (3) can be produced in a known manner. The polyurethane reaction system is preferably introduced between a layer (1) produced in advance from the polycarbonate composition according to the invention and a polymeric layer (3) and allowed to cure. Depending on the reactivity of the polyurethane reaction components, they can already be premixed or can be mixed in a known manner during application. Alternatively the layer (3) can be applied to a composite containing layers (1) and (2). This is preferably done by spraying, knife application or calendering.

In particular the polyurethane reaction components are reacted by the single-stage process known per se, the prepolymer process or the semi-prepolymer process. Details of processing equipment are described in Kunststoff-Handbuch, Volume VII, edited by Vieweg and Höchtlen, Carl-Hanser-Verlag, Munich 1966, for example on pages 121 to 205.

For the production of the polyurethane foam, foaming can also be performed according to the invention in closed moulds. Here the reaction mixture is introduced into a mould which already contains layer (1) and optionally layer (3). Suitable mould materials include metal or an alloy (e.g. aluminium, iron, steel) or plastic (e.g. epoxy resin).

The foamable reaction mixture foams in the mould and forms the composite moulding. Foam moulding can be carried out in such a way that the surface of the moulding has a cell structure, but it can also be performed in such a way that the moulding has a compact skin and a cellular core. In this connection it is possible to proceed in such a way that sufficient foamable reaction mixture is introduced into the mould such that the foam that is formed just fills the mould. However, it is also possible to proceed in such a way that more foamable reaction mixture is introduced into the mould than is necessary to fill the inside of the mould with foam.

In many cases "external release agents" known per se, such as silicone oils, are incorporated in foam moulding. It is also possible to use "internal release agents", however, optionally mixed with external release agents.

To produce compact PU materials the two polyurethane reaction components, as described above, are reacted by simply mixing them at room temperature.

A subsequent further coating of layers (1) and/or (2) and/or optionally (3) can be performed by the conventional, known methods of painting, metallisation or further coating with a polymeric layer.

The composite materials according to the invention are preferably used in automotive manufacture, in particular for the covering of soft interior components, for example as instrument panels or pillar trim.

The invention is described in more detail below by means of embodiment examples.

EXAMPLES

Polycarbonate compositions are produced in accordance with the information contained in Table 1, processed to produce specimens and tested.

Component A-1

Linear polycarbonate based on bisphenol A having a weight-average molecular weight $M_w$ of 28,000 g/mol (determined by GPC).

Component A-2

Linear polycarbonate based on bisphenol A having a weight-average molecular weight $\overline{M}_w$ of 27,500 g/mol (determined by GPC).

Component B-1

Metablen® SRK200 (Mitsubishi Rayon, Japan): styrene-acrylonitrile-grafted acrylate-silicone composite rubber, produced by emulsion polymerisation.

Component B-2

ABS polymer produced by bulk polymerisation of 82 wt. % relative to the ABS polymer of a mixture of 24 wt. % acrylonitrile and 76 wt. % styrene in the presence of 18 wt. % relative to the ABS polymer of a polybutadiene-styrene block copolymer rubber having a styrene content of 26 wt. %. The weight-average molecular weight $\overline{M}_w$ of the free SAN copolymer component in the ABS polymer is 80,000 g/mol (measured by GPC in THF). The gel content of the ABS polymer is 24 wt. % (measured in acetone).

Component B-3

Precompound consisting of 50 wt. % of an ABS polymer produced by emulsion polymerisation and 50 wt. % of a SAN copolymer. The precompound has an A:B:S weight ratio of 17:26:57. The weight-average molecular weight of the free SAN copolymer component in this ABS precompound is 150,000 g/mol. The percentage by weight of free copolymer in component C-2 is approximately 60 wt. %.

Component C

SAN copolymer having an acrylonitrile content of 23 wt. % and a weight-average molecular weight of approximately 130,000 g/mol.

Component D

Chopped strands having an average diameter of 13 μm and a size consisting of epoxy resin produced from epichlorohydrin and bisphenol A; the carbon content of the chopped strands is 0.6 wt. %.

Component E-1: Pentaerythritol tetrastearate

Component E-2: Phosphite stabiliser

PU system 1:

Bayfill® VP.PU 51IF88 G, Bayer MaterialScience AG, 51368 Leverkusen, Germany.

PU system 2:

Bayfill® VP.PU 51IF08 G, Bayer MaterialScience AG, 51368 Leverkusen, Germany.

PU system 3:

Bayfill® VP.PU 53IF10 G, Bayer MaterialScience AG, 51368 Leverkusen, Germany.

PU system 4:

Bayfill® VP.PU 53IF40 G, Bayer MaterialScience AG, 51368 Leverkusen, Germany.

Polypropylene Support (Comparative Material)

Alcom® PP-C 620/200 LGF30 BK (a polypropylene copolymer containing 30% long glass fibres from ALBIS PLASTIC GMBH, Mühlenhagen 35, D-20539 Hamburg).

TABLE 1

Composition of the PC/ABS supports

| Component (parts by wt.) | PCS-1 | PCS-2 |
|---|---|---|
| A-1 (polycarbonate) | 61.94 | — |
| A-2 (polycarbonate) | — | 59.36 |
| B-1 (graft polymer) | 0.50 | — |

TABLE 1-continued

Composition of the PC/ABS supports

| Component (parts by wt.) | PCS-1 | PCS-2 |
|---|---|---|
| B-2 (graft polymer) | — | 11.87 |
| B-3 (graft polymer) | — | 20.18 |
| C-1 (vinyl copolymer) | 26.97 | 7.52 |
| D (glass fibres) | 9.99 | — |
| E-1 | 0.50 | 0.74 |
| E-2 | 0.10 | 0.32 |

(a) Production of Composites According to the Prior Art (Comparative Examples 1 and 6):

The components of the polycarbonate compositions were mixed in a 3-litre internal mixer. Samples of the polycarbonate compositions were produced in an Arburg 270 E injection moulding machine at 260° C. The PU mixture was mixed in a two-component unit by the high-pressure process using a high-pressure mixing head and then introduced into an open foaming mould by means of a handling device. The mould was closed and at the end of the reaction time the part was removed.

To produce the composite the polycarbonate moulding compositions were coated with a thin 17-mm layer of 100 parts by weight of the respective PU system and 44 parts by weight of Desmodur® VP 44 V20LF (polymeric MDI, Bayer MaterialScience AG, Leverkusen, Germany) The mould was opened after 80 and 100 seconds respectively, the demould time was 90 and 120 seconds respectively, the mould temperature was 40° C.

(b) Production of Composites According to the Invention (Examples 2 to 5 and 7 to 10):

The components of the polycarbonate compositions were mixed in a 3-litre internal mixer. Samples of the polycarbonate compositions were produced in an Arburg 270 E injection moulding machine at 260° C. Nitrogen was introduced in accordance with the MuCell process from Trexel Inc.

The PU mixture was mixed in a two-component unit by the high-pressure process using a high-pressure mixing head and then introduced into an open foaming mould by means of a handling device. The mould was closed and at the end of the reaction time the part was removed.

To produce the composite the polycarbonate moulding compositions were coated with a thin 17-mm layer of 100 parts by weight of the respective PU system and 44 parts by weight of Desmodur® VP 44 V20LF (polymeric MDI, Bayer MaterialScience AG, Leverkusen, Germany). The mould was opened after 80 and 100 seconds respectively, the demould time was 90 and 120 seconds respectively, the mould temperature was 40° C.

(c) Production of Composites According to Comparative Examples 11 to 14:

A polypropylene support (Alcom® PP-C 620/200 LGF30 BK) was used as the comparative material.

The PU mixture was mixed in a two-component unit by the high-pressure process using a high-pressure mixing head and then introduced into an open foaming mould by means of a handling device. The mould was closed and at the end of the reaction time the part was removed.

To produce the composite the polypropylene support was coated with a thin 17-mm layer of 100 parts by weight of the respective PU system and 44 parts by weight of Desmodur® VP 44 V20LF (polymeric MDI, Bayer MaterialScience AG, Leverkusen, Germany). The mould was opened after 80 and 100 seconds respectively, the demould time was 90 and 120 seconds respectively, the mould temperature was 40° C.

To measure the foam adhesion the resulting composite material was tested by means of a conventional floating roller peel test by reference to DIN 53 357. Before the adhesion test the laminar structure underwent a double climatic test (KWT 02A) (10-day exposure to alternating climate conditions comprising cycles from −40° C. to 80° C., 0 to 80% relative humidity and a cycle time of 24 hours). The subsequent adhesion test was performed by means of a 90° peel test by reference to DIN 53 357 after reducing the foam thickness to 2 mm.

The drop and the modulus of the polycarbonate samples were determined in accordance with ISO 180/1 A and ISO 527 respectively.

The structure of the composites and the test results are summarised in Tables 2 to 4.

TABLE 2

| | Composites containing non-reinforced PC/ABS | | | | |
|---|---|---|---|---|---|
| | 1 (cmp) | 2 | 3 | 4 | 5 |
| Composition | | | | | |
| Support | PCS-2 | PCS-2 | PCS-2 | PCS-2 | PCS-2 |
| PU component | PU system 3 | PU system 1 | PU system 2 | PU system 3 | PU system 4 |
| Properties | | | | | |
| Initial adhesion [rating] | 3 | 1 | 1 | 1 | 1 |
| Foam adhesion after double climatic test (02A) [rating] | 4 | 2 | 2 | 2 | 2 |
| Blooming test [rating] | 4 | 2 | 2 | 3 | 3 |

TABLE 3

Composites containing reinforced PC/ABS

|  | 6 (cmp) | 7 | 8 | 9 | 10 |
|---|---|---|---|---|---|
| Composition |  |  |  |  |  |
| Support | PCS-1 | PCS-1 | PCS-1 | PCS-1 | PCS-1 |
| PU component | Prior art* 1 | PU system 1 | PU system 2 | PU system 3 | PU system 4 |
| Properties |  |  |  |  |  |
| Initial adhesion [rating] | 3 | 1 | 1 | 1 | 1 |
| Foam adhesion after double climatic test (02A) [rating] | 4 | 2 | 2 | 2 | 2 |
| Blooming test [rating] | 4 | 2 | 2 | 1 | 1 |

TABLE 4

Composites based on polypropylene supports

| Composition | 11 (cmp) | 12 (cmp) | 13 (cmp) | 14 (cmp) |
|---|---|---|---|---|
| Support | Polypropylene support | Polypropylene support | Polypropylene support | Polypropylene support |
| PU component | PU system 1 | PU system 2 | PU system 3 | PU system 4 |
| Properties |  |  |  |  |
| Initial adhesion [rating] | 5 | 5 | 5 | 5 |
| Foam adhesion after double climatic test (02A) [rating] | 5 | 5 | 5 | 5 |
| Blooming test [rating] | 5 | 5 | 5 | 5 |

Definition of Rating Scale:
Rating 1: very good adhesion
Rating 2: good adhesion
Rating 3: adhesion OK (PU can be scraped away from the support with a fingernail)
Rating 4: poor (i.e. only partial adhesion)
Rating 5: bare (no adhesion)

The test results show that the foam adhesion of the polycarbonate compositions according to the invention was improved with all the PU systems tested. In contrast to polypropylene and unmodified PC/ABS the composites according to the invention achieved the required rating of 1 to 3.

The polycarbonate compositions according to the invention still exhibit good adhesion to the polyurethane layer in the composite, even after undergoing a double climatic test based on PV1200 from Volkswagen AG.

The invention claimed is:

1. Method for producing a composite material, comprising
   (i) producing a foamed polycarbonate moulding composition by injection moulding using chemical and/or physical foaming techniques, and
   (ii) applying a polyurethane reaction system on top of said polycarbonate moulding composition and allowing to cure;
   wherein said moulding composition comprises:
   A) 20 to 99.9 parts by weight of aromatic polycarbonate and/or aromatic polyester carbonate,
   B) 0.1 to 40 parts by weight of rubber-modified graft polymer,
   C) 0 to 40 parts by weight of vinyl (co)polymer (C.1) and/or polyalkylene terephthalate (c.2),
   D) 0 to 50 parts by weight of glass fibres, and
   E) 0 to 30 parts by weight of additives.

2. Method according to claim 1, wherein the polycarbonate moulding composition comprises glass fibres.

3. Method according to claim 1, wherein the foamed polycarbonate moulding composition is produced by injection moulding, by
   (i-1) mixing A-E of the polycarbonate composition and
   (i-2) melt compounding and melt extruding the mixture resulting from (i-1) at a temperature of 200° C. to 320° C. wherein
   in (i-2)
   (i-2.1) a batch comprising chemical blowing agent and at least one of components A, B or C is fed to an extruder with the mixture resulting from (i-1), or
   (i-2.2) a chemical blowing agent is mixed with the mixture resulting from (i-1), or
   (i-2.3) a physical blowing agent is added to the melt.

4. Method according to claim 3, wherein the chemical blowing agent is used and is citric acid and/or formic acid.

5. Method according to claim 3, wherein the physical blowing agent is used and is an inert gas.

6. Method according to claim 3, wherein the physical blowing agent is used and is nitrogen, argon, or carbon dioxide.

7. Method according to claim 1, wherein the foamed polycarbonate moulding composition are produced by injection moulding, by
   (i-1) mixing AE of the polycarbonate composition
   (i-2) melt compounding and melt extruding the mixture resulting from (i-1) at a temperature of 200° C. to 320° C.
   wherein, in (i-2)
   (i-2.3) a physical blowing agent is added to the melt, the addition being made
      to a screw of an extruder or a twin-shaft screw, or
      to a space in front of a screw of an extruder or a twin-shaft screw, or
      to the resulting mixture immediately after an internal mixer, extruder or twin-shaft screw.

8. Method according to claim 7, wherein the physical blowing agent is an inert gas.

9. Method according to claim 7, wherein the physical blowing agent is nitrogen, argon, or carbon dioxide.

10. Method according to claim 1, wherein component C) is present.

11. Method according to claim 1, wherein said moulding composition comprises:
- A) 50 to 91.5 parts by weight of aromatic polycarbonate and/or aromatic polyester carbonate,
- B) 0.4 to 35 parts by weight of rubber-modified graft polymer,
- C) 1 to 30 parts by weight of vinyl (co)polymer (C.1) and/or polyalkylene terephthalate (C.2),
- D) 7 to 35 parts by weight of glass fibres, and
- E) 0.1 to 18 parts by weight of additives.

12. Method according to claim 1, wherein component B) comprises one or more graft polymers of
- B.1 10 to 90 wt % relative to component B, of at least one vinyl polymer on
- B.2 90 to 10 wt. % relative to component B, of at least one graft base selected from the group consisting of diene rubbers, EP(D)M rubbers, acrylate, polyurethane, silicone, silicone acrylate, chloroprene and ethylene/vinyl acetate rubbers.

13. Method according to claim 1, wherein component D) is present and is a sized glass fibre having
- D.1 a glass fibre selected from at least one component of the group consisting of continuous strands, long glass fibres, and chopped strands,
- D.2 a size containing an epoxy polymer, wherein the size partially or wholly covers the surface of the glass fibres and/or fills any pores in the glass fibres, and
- D.3 optionally a coupling agent.

14. Method according to claim 1, wherein component E) is present and is selected from the group consisting of flame retardants, flame retardant synergists, antidripping agents, lubricants and release agents, nucleating agents, antistatics, stabilisers, fillers and reinforcing materials differing from component D), and dyes and pigments.

15. Method according to claim 1, wherein the polyurethane reaction system is a polyurethane foam and/or a compact polyurethane layer.

16. Method according to claim 1, wherein said composite material comprises at least one further polymeric layer (3).

17. Method according to claim 16, wherein the further polymeric layer (3) is a layer based on polyvinyl chloride (PVC) and/or a thermoplastic urethane (TPU).

18. Method according to claim 16, wherein layer (3) is joined directly to the polyurethane reaction system.

19. Method according to claim 1, wherein the composite material achieves an initial adhesion rating of less than 3, achieves a foam adhesion after double climate test rating of less than 3, or achieves a blooming rate rating of 1-3.

* * * * *